(12) United States Patent
Chevalier et al.

(10) Patent No.: US 8,612,145 B2
(45) Date of Patent: Dec. 17, 2013

(54) METHOD FOR STAND-ALONE ALIGNMENT OF AN INERTIAL UNIT FOR AN ONBOARD INSTRUMENT CAPABLE OF BEING MOUNTED IN AN AIRCRAFT, AND AN ONBOARD INSTRUMENT BEING ABLE TO USE SUCH A METHOD

(75) Inventors: Jean-René Chevalier, Cenon sur Vienne (FR); Gaël Mulhaupt, Poitiers (FR); Philippe Chesne, Vendôme (FR)

(73) Assignee: Thales, Neuilly sur Seine (FR)

( * ) Notice: Subject to any disclaimer, the term of this patent is extended or adjusted under 35 U.S.C. 154(b) by 614 days.

(21) Appl. No.: 12/809,598

(22) PCT Filed: Dec. 2, 2008

(86) PCT No.: PCT/EP2008/066663
§ 371 (c)(1),
(2), (4) Date: Oct. 21, 2010

(87) PCT Pub. No.: WO2009/083374
PCT Pub. Date: Jul. 9, 2009

(65) Prior Publication Data
US 2011/0035081 A1 Feb. 10, 2011

(30) Foreign Application Priority Data
Dec. 21, 2007 (FR) ..................................... 07 09034

(51) Int. Cl.
*B64C 17/06* (2006.01)
*G01C 21/16* (2006.01)

(52) U.S. Cl.
USPC ............................................. 701/500; 701/14

(58) Field of Classification Search
USPC ............... 701/3, 4, 10, 14, 15, 500–502, 504, 701/505; 340/501, 975, 524, 689, 686.2; 73/1.37–1.39, 1.75–1.78; 702/87, 94, 702/150–154
See application file for complete search history.

(56) References Cited

U.S. PATENT DOCUMENTS

| | | | |
|---|---|---|---|
| 6,686,851 B1 * | 2/2004 | Gordon et al. | 340/970 |
| 7,280,916 B2 * | 10/2007 | Bang et al. | 701/505 |
| 2006/0047427 A1 * | 3/2006 | Weed et al. | 701/220 |
| 2006/0169021 A1 | 8/2006 | Silverstein | |
| 2006/0212182 A1 * | 9/2006 | Shaw | 701/12 |
| 2010/0219986 A1 * | 9/2010 | Azoulai | 340/945 |
| 2011/0137560 A1 * | 6/2011 | May | 701/220 |

FOREIGN PATENT DOCUMENTS

DE 3443317 6/1986
DE 3928738 3/1991

* cited by examiner

*Primary Examiner* — Jason Holloway
(74) *Attorney, Agent, or Firm* — Baker & Hostetler LLP (57) ABSTRACT

In a method for stand-alone alignment of an inertial unit for an onboard instrument capable of being mounted in an aircraft, the method includes monitoring the appearance of a movement of the inertial unit during the alignment, suspending the alignment of the inertial unit in the event of the appearance of movement, and resuming the alignment of the inertial unit on the disappearance of the movement.

15 Claims, 4 Drawing Sheets

FIG.8

METHOD FOR STAND-ALONE ALIGNMENT OF AN INERTIAL UNIT FOR AN ONBOARD INSTRUMENT CAPABLE OF BEING MOUNTED IN AN AIRCRAFT, AND AN ONBOARD INSTRUMENT BEING ABLE TO USE SUCH A METHOD

CROSS-REFERENCE TO RELATED APPLICATIONS

This application is a National Stage of International patent application PCT/EP2008/066663, filed on Dec. 2, 2008, which claims priority to foreign French patent application No. FR 07 09034, filed on Dec. 21, 2007, the disclosures of which are incorporated by reference in their entirety.

FIELD OF THE INVENTION

The invention relates to a method for stand-alone alignment of an inertial unit for an onboard instrument capable of being mounted in an aircraft, and an onboard instrument using such a method. The invention relates in particular to a method for stand-alone alignment of an inertial unit for a stand-by instrument generating and displaying information relating to the speed, altitude and attitude of an aircraft. It is particularly useful for the alignment of inertial units mounted in aircraft which can take off from non-stabilized platforms, such as oil platforms, aircraft carriers or helicopter carriers. However, it can also be applied for the alignment of inertial units mounted in aircraft taking off from stable platforms, such as an airstrip, insofar as the aircraft may be subjected to movements, even when stopped, for example due to wind or ground support facilities around the aircraft.

BACKGROUND OF THE INVENTION

Stand-by instruments are stand-alone onboard instruments which generate and display flight information which is essential to the pilot of an aircraft in the event of failure of primary onboard instruments. This flight information, generally obtained with less precision than that of the primary onboard instruments, essentially relates to the speed, altitude and attitude of the aircraft. In order to guarantee the stand-alone capability of the stand-by instruments in relation to the primary onboard instruments, the stand-by instruments must have their own sensors in order to generate and display the speed, altitude and attitude of the aircraft. In particular, the stand-by instruments normally comprise a static pressure sensor, a total pressure sensor and an inertial unit.

The static and total pressure sensors are connected respectively to a static pressure connector and a total pressure connector located on the skin of the aircraft. The static pressure allows the altitude of the aircraft to be determined. The difference between the total pressure and the static pressure allows the speed of the aircraft to be determined in relation to the air.

The inertial unit comprises 3 gyrometers and 2 or 3 accelerometers. The gyrometers measure the speed of rotation of the sensor referential, here a system of axes linked to the stand-by instrument, in relation to an inertial referential. Through integration of the rotation speeds, it is possible to identify the position of the stand-by instrument in relation to the inertial referential and therefore, knowing the position of the stand-by instrument in relation to the aircraft and the position of the local geographical frame of reference in relation to the inertial frame of reference, it is possible to identify the position of the aircraft in relation to the local geographical frame of reference. The position of the aircraft in relation to the local geographical frame of reference, referred to as the attitude of the aircraft, is determined in relation to a roll axis, a pitch axis and a yaw axis, and the movements around these axes are referred to respectively as the roll, pitch and yaw. Accelerometers measure non-gravitational forces applied to the aircraft, from which translation accelerations of the sensor referential in relation to the inertial referential are deduced. The combination of gyrometers and accelerometers enables a precise determination of the attitude of the aircraft, the data supplied by the accelerometers being used in preference to the data supplied by the gyrometers in the static or quasi-static flight phases, and the data supplied by the gyrometers being used in preference to the data supplied by the accelerometers during the dynamic phases of the flight.

When an aircraft, and in particular a stand-by instrument, is powered up, the inertial unit of the stand-by instrument must be initialized in order to supply the most reliable attitude information possible during the flight. This initialization includes an alignment phase, consisting notably in estimating the drift of the different gyrometers, i.e. the speed of rotation measured by the gyrometers in the absence of any movement of the latter. The gyrometers being electronic sensors, their drift may differ between two different power-ups of the inertial unit, to the point of rendering unusable any measurement carried out by these gyrometers and therefore any attitude displayed by the stand-by instrument. It is therefore necessary to determine the drift of the gyrometers on every power-up. Moreover, the alignment of the gyrometers must be carried out in the absence of any movement of the inertial unit, otherwise a movement of the inertial unit will be integrated into the drift of a gyrometer.

To ensure the correct alignment of the gyrometers of an inertial unit, it is known to check for the presence or absence of movements of the inertial unit by means of the accelerometers of the inertial unit. For the entire duration of the alignment, the accelerometers measure the non-gravitational forces of the inertial unit in relation to the inertial referential. In the event of movement of the inertial unit during the alignment, measured by the accelerometers, the stand-by instrument, at the end of the alignment, invalidates the determination of the drift of each gyrometer, displays a message indicating the detection of movement to the pilot and asks the pilot to restart the alignment either by switching off the stand-by instrument then powering it up again, or by pressing a button on the front surface of the stand-by instrument. This restart of the alignment is imperative insofar as the availability of the stand-by instrument, and therefore the alignment of the inertial unit, is a necessary condition for the aircraft take-off authorization.

A solution of this type presents a plurality of disadvantages. A first disadvantage is the wait for the end of the alignment in order to indicate the detection of a movement during the alignment. It is therefore only at the end of the alignment of the gyrometers that the pilot is aware of the invalidation of the alignment and can restart it. Consequently, the time elapsed between the detection of movement and the end of the alignment is lost. A second disadvantage is the loss of the estimation of the drifts carried out between the start of the alignment and the detection of a movement. At the end of the invalidated alignment, the entire alignment procedure is restarted, entailing the risk that the estimated drift has been distorted by the movement. Moreover, if the alignment is restarted by a hardware reset, i.e. by switching off the stand-by instrument then powering it up again, there is a risk that the drift of the gyrometers will change, rendering the preceding determination of the drifts obsolete. A third disadvantage is the impossibility, in certain situations, of being able to carry out an alignment. This may notably occur if the aircraft has started up on a moving platform. In most cases, the movement of the platform, for example due to the swell of the sea, cannot be prevented. The aircraft must then wait for the cessation of the movements, in this case a calming of the swell, to be able to take off. An immobilization of this type is indisputably detrimental to the economic efficiency of the aircraft.

SUMMARY OF THE INVENTION

An object of the invention is notably to overcome all or some of the aforementioned disadvantages. For this purpose, the subject of the invention is a method for stand-alone alignment of an inertial unit for an onboard instrument capable of being mounted in an aircraft. According to the invention, the method includes the following steps:

- monitoring the appearance of a movement of the inertial unit during the alignment,
- suspending the alignment of the inertial unit in the event of the appearance of movement,
- resuming the alignment of the inertial unit on the disappearance of the movement.

The subject of the invention is also an onboard instrument, capable of being mounted in an aircraft, including an inertial unit comprising means for stand-alone alignment. According to the invention, the onboard instrument includes means for monitoring the appearance of a movement of the inertial unit during the alignment, means for suspending the alignment in the event of the appearance of movement, and means for resuming the alignment of the inertial unit on the disappearance of the movement.

The advantage of the invention is notably that it enables a fast and reliable alignment of the inertial unit without increasing the complexity of the drift calculation algorithm. In particular, the alignment may be carried out during all periods when no movement of the inertial unit is detected, but solely during these periods. This results in an optimization of the duration of the alignment. Moreover, the alignment remains protected against movements of the inertial unit. It is even possible to increase the precision of the alignment by lowering the threshold for the detection of movements of the inertial unit, insofar as the alignment duration is optimized.

BRIEF DESCRIPTION OF THE DRAWINGS

The invention will be more easily understood and other advantages will become clear upon reading the detailed description of an embodiment, presented by way of example, and set out with reference to the attached drawings, in which.

DETAILED DESCRIPTION

The description which follows is provided in relation to a stand-by instrument. It is obviously possible to implement the invention on the basis of any onboard instrument comprising an inertial unit.

Figure 1:
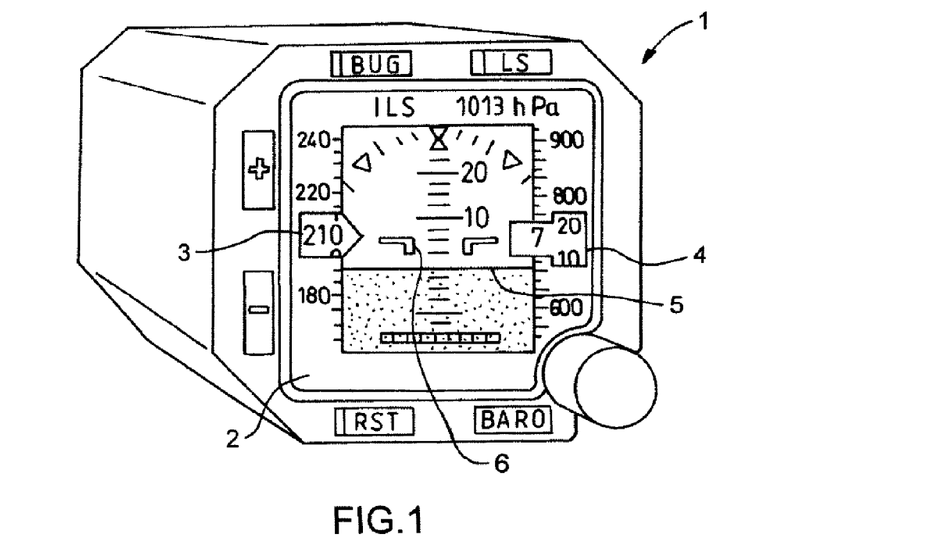
FIG. 1 shows a stand-by instrument capable of being mounted in an aircraft.

FIG. 1 shows a stand-by instrument 1 capable of being mounted in an aircraft. The stand-by instrument 1 comprises a display 2, for example a liquid-crystal screen. The display 2 displays flight information essential to the pilot for controlling the aircraft. This information concerns notably the air speed, altitude and attitude of the aircraft. The air speed and altitude of the aircraft are shown in the form of rotating vertical graduated scales, a scale 3 indicating the air speed of the aircraft and a scale 4 indicating the altitude of the aircraft. The attitude of the aircraft is symbolized by a horizon line 5 movable in relation to a fixed silhouette 6 representing the aircraft. The air speed and altitude information is obtained from anemo-barometric sensors connected on the one hand to pressure connectors disposed on the skin of the aircraft and, on the other hand, to a calculator. The anemo-barometric sensors supply a static pressure Ps and a total pressure Pt of the air surrounding the aircraft on the basis of which the calculator determines the air speed and altitude of the aircraft. The attitude of the aircraft is obtained from an inertial unit including gyrometers and accelerometers, as explained below. The anemo-barometric sensors, the inertial unit and the calculator form means for determining the flight parameters. These determination means are stand-alone, as they belong to the stand-by instrument and can function with no external information other than the information originating from the pressure connectors.

Figure 2:
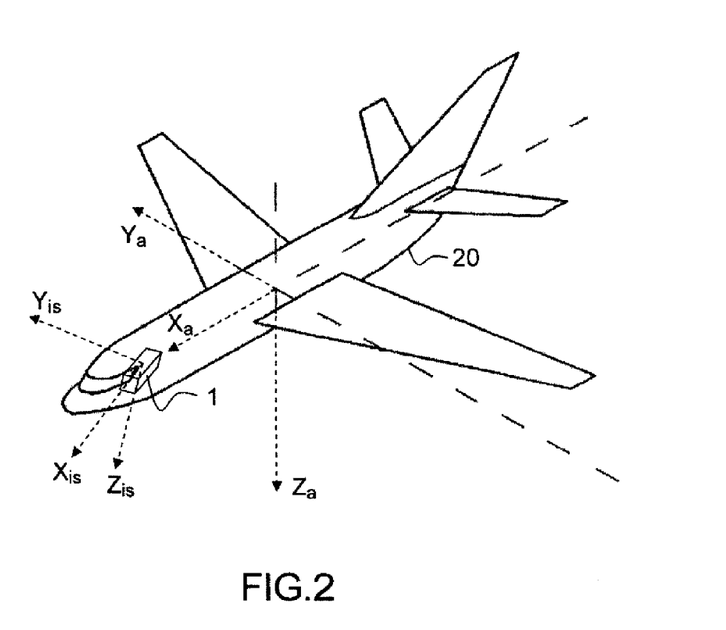
FIG. 2 shows an aircraft fitted with the stand-by instrument shown in FIG. 1, the aircraft and the stand-by instrument each having a system of axes.
Figure 3:
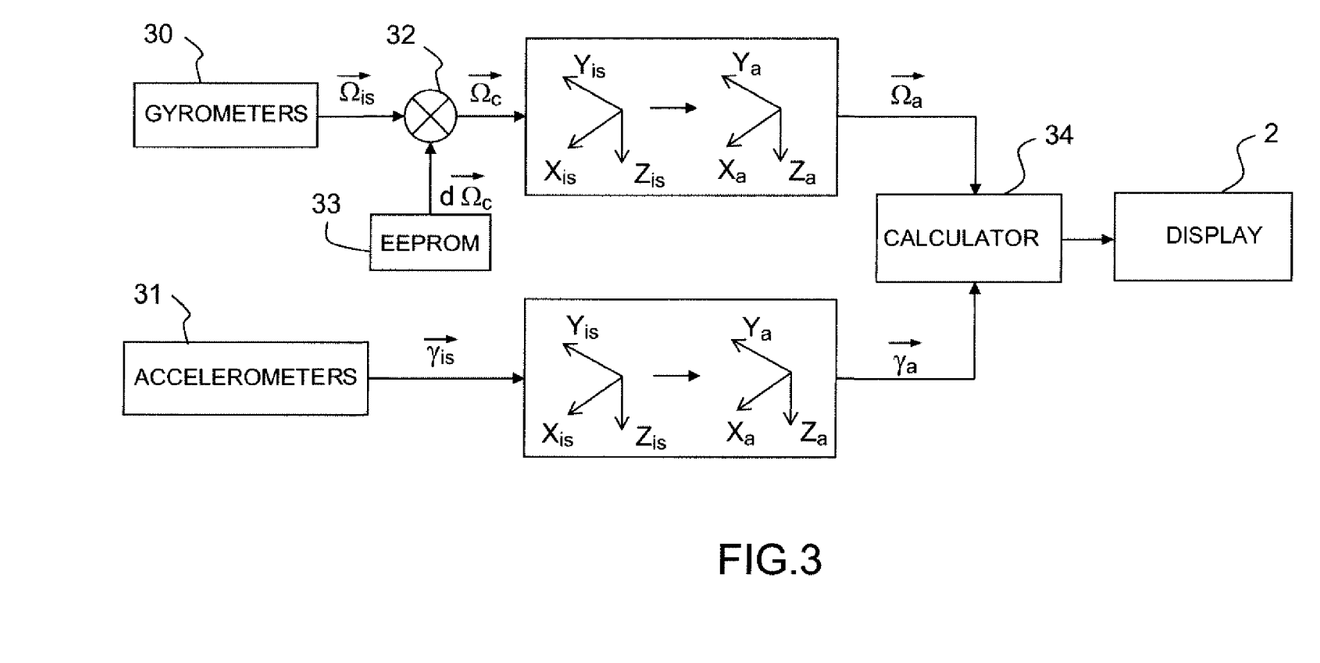
FIG. 3 shows a synopsis of the means implemented by the stand-by instrument for calculating and displaying the attitude of the aircraft.

FIG. 2 shows an aircraft 20 equipped with the stand-by instrument 1 and FIG. 3 shows a synopsis of the means implemented by the stand-by instrument 1 to calculate and display the attitude of the aircraft 20. The inertial unit of the stand-by instrument 1 generally includes 3 gyrometers 30 and 3 accelerometers 31. The gyrometers 30 measure angular speeds $\vec{\Omega}_{is}$ of a frame of reference $R_{is}(\vec{X}_{is}, \vec{Y}_{is}, \vec{Z}_{is})$ linked to the stand-by instrument 1 in relation to an inertial frame of reference. For the sake of readability of the description, the movements of the earth can be ignored and the local geographical frame of reference point, referred to as the terrestrial frame of reference $R_t(\vec{X}_t, \vec{Y}_t, \vec{Z}_t)$ can be considered in the description below as being the inertial frame of reference. However, for an implementation of the invention, it will be possible to take account of the movements of the earth in relation to the inertial frame of reference. As shown in FIG. 3, the angular speeds $\vec{\Omega}_{is}$ of the inertial unit are corrected by means of an operator 32 of the internal drifts $\vec{d\Omega}_c$ of the inertial unit. The internal drifts $\vec{d\Omega}_c$ are, for example, stored in a RAM memory 33. Means for determining the internal drifts $\vec{d\Omega}_c$ will be described below. The angular speeds thus corrected and denoted $\vec{\Omega}_c$ in the frame of reference $R_t(\vec{X}_t, \vec{Y}_t, \vec{Z}_t)$ are transformed to obtain the angular speeds $\vec{\Omega}_a$ of a frame of reference linked to the aircraft 20 and denoted $R_a(\vec{X}_a, \vec{Y}_a, \vec{Z}_a)$ in relation to the frame of reference $R_t(\vec{X}_t, \vec{Y}_t, \vec{Z}_t)$. Similarly, the accelerometers 31 measure translation accelerations $\vec{\gamma}_{is}$ of the frame of reference $R_{is}(\vec{X}_{is}, \vec{Y}_{is}, \vec{Z}_{is})$ linked to the stand-by instrument 1 in relation to the terrestrial frame of reference $R_t(\vec{X}_t,\vec{Y}_t,\vec{Z}_t)$. These translation accelerations $\vec{\gamma}_{is}$ are also transformed to obtain the translation accelerations $\vec{\gamma}_a$ of the frame of reference $R_a(\vec{X}_a,\vec{Y}_a,\vec{Z}_a)$ linked to the aircraft 20 in relation to the frame of reference $R_t(\vec{X}_t,\vec{Y}_t,\vec{Z}_t)$. The angular speeds $\vec{\Omega}_a$ and the translation accelerations $\vec{\gamma}_a$ allow the attitude of the aircraft 20 to be determined in relation to the terrestrial frame of reference $R_t(\vec{X}_t,\vec{Y}_t,\vec{Z}_t)$ by means of a calculator 34 belonging to the inertial unit. Advantageously, the calculator 34 also carries out the transformations of angular speeds and of translation accelerations. In one particular embodiment, only the translation accelerations $\vec{\gamma}_a$ are used to determine the attitude of the aircraft 20 when it is in stabilized flight. Conversely, only the angular speeds $\vec{\Omega}_a$ are used to determine the attitude of the aircraft 20 when it is in dynamic flight. Other embodiments are possible. In particular, it is possible to use a weighting of the translation accelerations $\vec{\gamma}_a$ and of the angular speeds $\vec{\Omega}_a$ to determine the attitude of the aircraft 20, said weighting being variable according to the flight conditions. The attitude of the aircraft 20 is displayed on the display 2 of the stand-by instrument 1.

Figure 4:
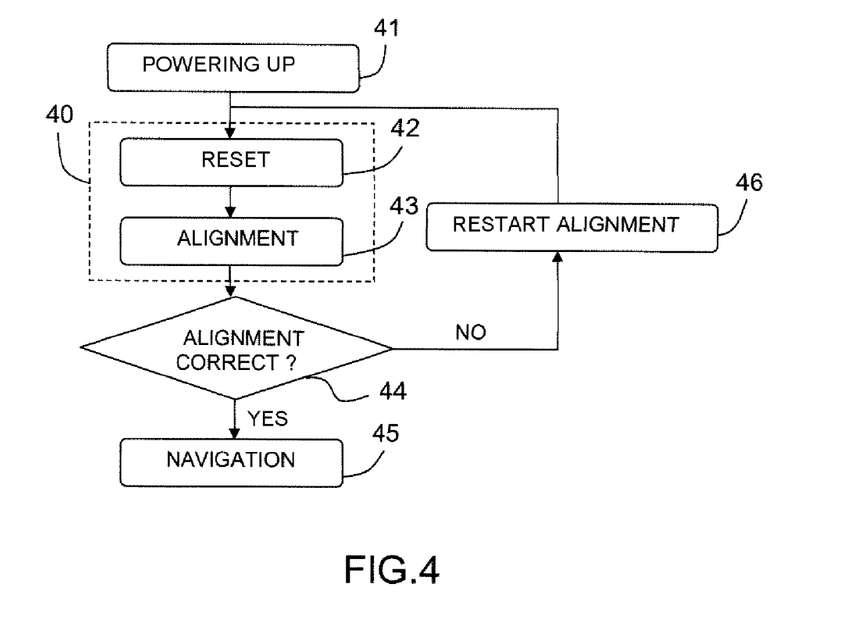
FIG. 4 shows an example of steps implemented for the initialization of the stand-by instrument.

FIG. 4 shows steps implemented for the initialization of a stand-by instrument 1. On the power-up of the stand-by instrument 1, a rough estimation, referred to as the setup 42, of the internal drifts $\vec{d\Omega}_c$ of the inertial unit is carried out. This setup 42 allows a minimum value and a maximum value to be determined for each drift of the gyrometer 30. At the end of the setup 42, a fine alignment, also referred to as the alignment 43, is carried out to determine precisely the drift of each gyrometer 30. The alignment 43 comprises notably a step of measurement of the instantaneous drifts and a step of filtering of these drifts to obtain precise values of the internal drifts $\vec{d\Omega}_c$. The setup 42 and the alignment 43 are referred to as the global alignment 40. During this global alignment 40, the accelerometers 31 monitor the movements of the inertial unit. At the end of the alignment 43, a control step 44 examines whether the movements detected by the accelerometers 31 have not exceeded a predefined threshold and if the internal drifts $\vec{d\Omega}_c$ are between the minimum and maximum values determined during the setup 42. If so, the internal drifts $\vec{d\Omega}_c$ are recorded in the RAM memory 33 of the stand-by instrument 1. The stand-by instrument 1 is ready for the navigation 45 and displays the information relating to the attitude of the aircraft 20. In all other cases, the internal drifts $\vec{d\Omega}_c$ are invalidated and the global alignment 40 is restarted according to the reference sign 46.

The steps implemented in FIG. 4 do not enable a fast alignment of the inertial unit if movements are detected. In particular, the time elapsed between the detection of a movement and the end of the alignment is lost, the global alignment 40 being invalidated. Similarly, the time elapsed between the start of the setup 42 and the detection of the movement is also lost, the intermediate drifts not being re-used for the subsequent global alignment 40. Moreover, these steps do not enable a global alignment 40 of the gyrometers 30 if the movements are repeated and, in particular, if the time elapsing between two movements is each time less than the duration necessary for the global alignment 40.

Figure 5:
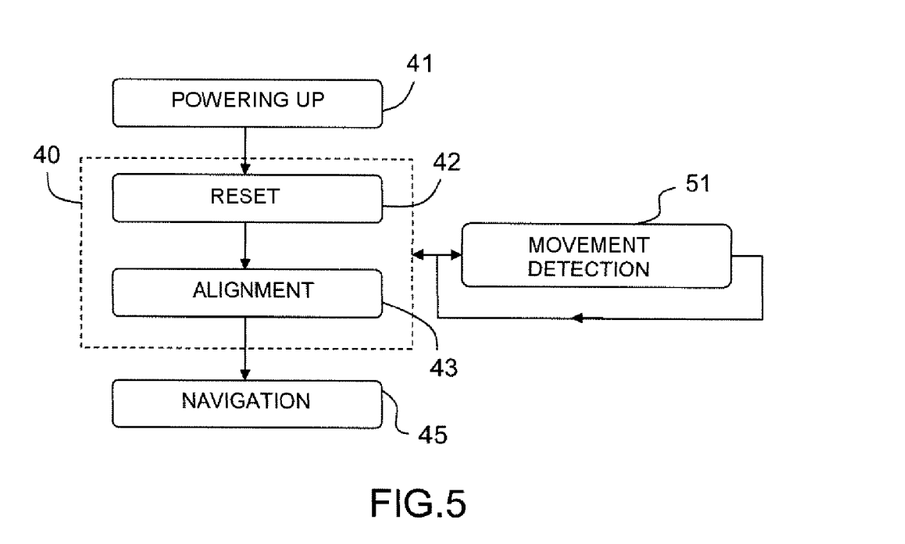
FIG. 5 shows an example of steps implemented according to the invention for the initialization of the stand-by instrument.

According to the invention and as shown in FIG. 5, following the power-up 41 of the stand-by instrument 1, the movements of the inertial unit are monitored during the setup 42 and the alignment 43. If movement is detected, the setup 42 or the alignment 43 of the inertial unit is suspended. If no more movement is detected, the setup 42 or the alignment 43 of the inertial unit 43 is resumed. The detection of a movement, the suspension of the global alignment 40 and its resumption are shown by the reference sign 51. At the end of the alignment 43, the internal drifts of the gyrometers 30 are recorded, for example in the RAM memory 33 of the stand-by instrument 1, and the stand-by instrument 1 can be used to determine and display the attitude of the aircraft 20.

Figure 6:
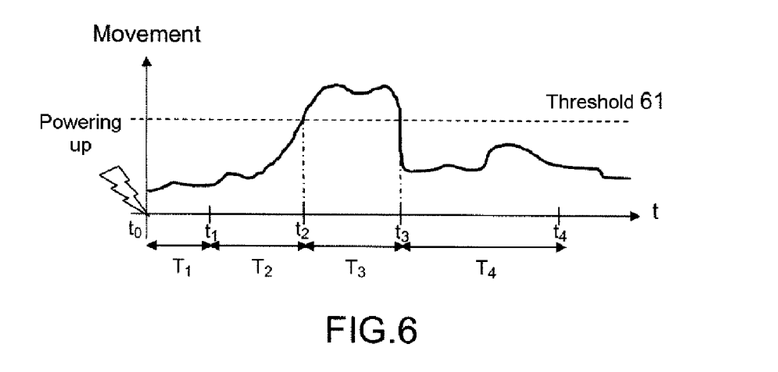
FIG. 6 shows, in the form of a chronogram, an example of the initialization of the stand-by instrument during which a movement is detected.

FIG. 6 shows, in the form of a chronogram, an example of the initialization of the stand-by instrument 1 during which a movement is detected by an accelerometer 31 according to an axis of the stand-by instrument 1. The time is shown on the x-axis and the movements are shown on the y-axis. For this example, the amplitude of the acceleration of the movement is considered. However, other types of movement can be monitored. On the power-up 41 of the stand-by instrument 1 at a time t0, the setup 42 of the inertial unit is carried out for a period T1, generally around ten seconds. This setup 42 allows a minimum value and a maximum value to be defined for each drift of the gyrometers 30. At the end of the setup 42, from a time t1 and for a duration T2, the fine alignment 43 of the inertial unit is carried out until a time t2 from which a movement is detected. For an entire duration T3 when the movement is detected, i.e. between the times t2 and t3, the alignment 43 is suspended. Advantageously, only the movements exceeding a determined amplitude, referred to as the threshold 61, suspend the global alignment 40. For the duration T3, the determination of the internal drifts $\vec{d\Omega}_c$ is suspended. In other words, the measurements of the drifts for this duration T3 are not taken into account in determining the internal drifts $\vec{d\Omega}_c$. Conversely, the intermediate values of drifts obtained between the times t0 and t2 are stored, for example, in the RAM memory 33, to be re-used on resumption of the alignment 43. If, at time t3, the amplitude of the movement again falls below the threshold 61, the alignment 43 is resumed where it had been suspended, with the intermediate values of drifts obtained between the times t0 and t2. More generally, the step of suspension of the alignment 40 of the inertial unit may include a sub-step consisting in recording current values used for the alignment 40, and the step of resumption of the alignment 40 may include a sub-step consisting in recovering the recorded values for the continuation of the alignment 40.

According to a particular embodiment, the alignment 43 has a fixed, parameterizable duration referred to as ALN_Duration. The duration ALN_Duration is generally around several tens of seconds, for example 80 seconds, and may be parameterized according to the latitude at which the aircraft 20 is located. According to this embodiment, the alignment 43 continues at time t3 for a duration T4 in such a way that the addition of the durations T2 and T4 is more or less equal to the duration ALN_Duration. A difference in duration may be explained notably by the duration necessary for the resumption of the alignment 43.

In this example, it is considered that the movement is detected during the alignment 43. However, the same method can be applied during the setup 42. Similarly, the global alignment 40 can be interrupted and resumed an unlimited number of times.

In the aforementioned example, described with reference to FIG. 6, the detection of movement is considered as the exceeding of a threshold by an acceleration amplitude according to an axis of the stand-by instrument 1. The invention is not limited to this form of detection and encompasses any form of movement of the stand-by instrument 1. In particular, it is possible to detect the movements either by means of an accelerometer or by means of a gyrometer, or by a combination of accelerometers and gyrometers. Advantageously, the accelerometers and/or gyrometers of the inertial unit are used. The stand-alone capability of the stand-by instrument 1 is thus maintained. However, it can be envisaged to use sensors outside the stand-by instrument 1. According to the instruments used, it is possible to monitor a translation acceleration and/or an angular speed of the stand-by instrument 1. It is understood that the movement can also be monitored through the observation of a translation speed of the stand-by instrument 1, i.e. the observation of an integrated translation acceleration. The movements can be referenced in a frame of reference $R_{is}(\vec{X}_{is}, \vec{Y}_{is}, \vec{Z}_{is})$ linked to the stand-by instrument 1 or in a frame of reference $R_a(\vec{X}_a, \vec{Y}_a, \vec{Z}_a)$ linked to the aircraft 20. It is possible to pass from one frame of reference to another by a simple change of frame of reference, the stand-by instrument 1 being fixed in the aircraft 20. In a particular embodiment, the monitored movements of the stand-by instrument 1 include an angular speed around a yaw axis of the aircraft and translation speeds according to the yaw axis of the aircraft and the roll and pitch axes of the aircraft.

According to a particular embodiment, the method according to the invention displays on the display 2 of the stand-by instrument 1 a countdown of the remaining duration before the end of the alignment 43. The countdown of the remaining duration is started at the start of the alignment 43, but it can also be envisaged to start the countdown of the remaining duration at the start of the setup 42. For this embodiment, the following are considered:

a fixed duration "ALN_Duration" to carry out the alignment 43 in the absence of movement,
a time variable "Tps_ALN_actual" representing the duration during which the drifts were estimated during the alignment 43,
a time variable "Tps_ALN_remaining" corresponding to the remaining duration necessary for the alignment 43 in the absence of movements,
a Boolean variable "B_OTM" assuming the value "true" if a movement is detected and the value "false" if not,
a Boolean variable "B_ALN_Complete" assuming the value "true" if the alignment 43 has ended and the value "false" if not.

All the durations and time variables contain integers representing a number of seconds. At the end of the setup 42, the variable "Tps_ALN_actual" is initialized to the value zero and the variable "B_ALN_Complete" is initialized to the value "false". During the alignment 43, the variable "Tps_ALN_actual" is incremented by one unit every second. The variable "Tps_ALN_remaining" is determined by the following relation:

$$Tps\_ALN\_\text{remaining} = ALN\_\text{Duration} - Tps\_ALN\_\text{actual}$$

An example of an algorithm allowing the remaining duration necessary for the alignment 43 to be determined is set out below:

```
While B_ALN_Complete = false
    If B_OTM = false then
        Tps_ALN_actual ← Tps_ALN_actual + 1
    End if
    Tps_ALN_remaining ← ALN_Duration − Tps_ALN_actual
    If Tps_ALN_remaining <= 0 then
        B_ALN_Complete ← true
    End if
End while
```

At the end of the alignment 43, the display 2 of the stand-by instrument 1 can display a message indicating to the pilot that the global alignment 40 has ended. The display 2 may also directly display the attitude of the aircraft 20.

In a particular embodiment, the global alignment 40 of the inertial unit is cancelled if the time elapsed since the start of the alignment 43 added to the remaining duration before the end of the alignment 43 "Tps_ALN_remaining" is greater than a maximum determined duration. For this embodiment, the following are considered in addition to the fixed duration "ALN_Duration" and the previously defined variables:

a fixed duration "Max_Duration" corresponding to the maximum authorized duration for the alignment 43 of the inertial unit,
a variable "Tps_ALN_total" representing the time elapsed since the start of the alignment 43. This time corresponds to the duration "Tps_ALN_actual" plus the time during which movements were detected,
a Boolean variable "B_ALN_TooLong" assuming the value "true" if the duration necessary for the alignment 43 is greater than the maximum duration authorized for the alignment 43 of the inertial unit (Max_Duration).

The preceding algorithm is modified in the following manner:

```
While (B_ALN_Complete = false) and (B_ALN_Complete = false)
    Tps_ALN_total ← Tps_ALN_total + 1
    If B_OTM = false, then
        Tps_ALN_actual ← Tps_ALN_actual + 1
    End if
    Tps_ALN_remaining ← ALN_Duration − Tps_ALN_actual
    If Tps_ALN_remaining <= 0 then
        B_ALN_Complete ← true
    End if
    If (Tps_ALN_remaining + Tps_ALN_total) > Max_Duration then
        B_ALN_TooLong ← true
    End if
End while
```

Figure 7:
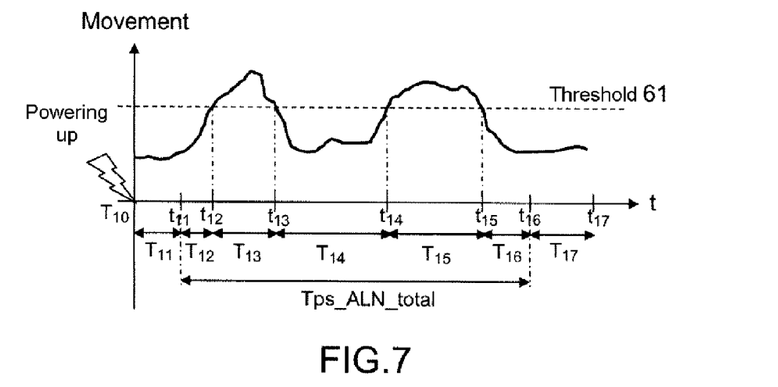
FIG. 7 shows, in the form of a chronogram, another example of the initialization of the stand-by instrument during which movements are detected.
Figure 8:
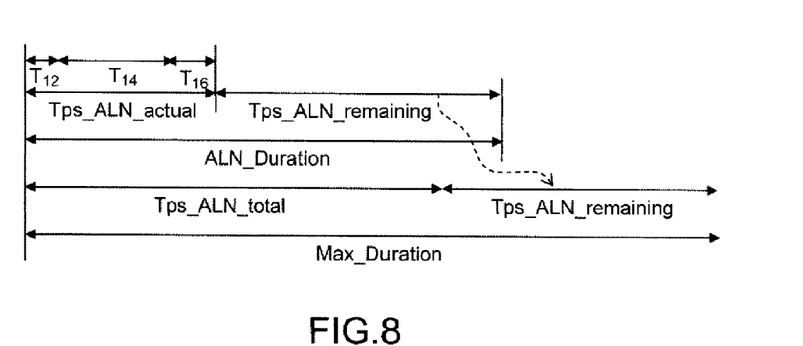
FIG. 8 shows an illustration of different times involved during the initialization of the stand-by instrument.

FIGS. 7 and 8 illustrate this particular embodiment in which a maximum duration "Max_Duration" is authorized for the alignment 43 of the inertial unit. In the following example, it is considered that the alignment 43 is interrupted for a total duration sufficiently long so that the duration of the alignment 43 exceeds the maximum duration authorized for the alignment 43 (Max_Duration).

FIG. 7 shows, in the form of a chronogram, an example of the initialization of the stand-by instrument 1 during which movements are detected. The time is shown on the x-axis and the movements are shown on the y-axis. On the power-up 41 of the stand-by instrument 1 at a time $t_{10}$, the setup 42 of the inertial unit is carried out for a period $T_{10}$. At the end of the setup 42, from a time $t_{11}$ and for a duration $T_{12}$, the fine alignment 43 of the inertial unit is carried out until a time $t_{12}$ from which a movement is detected. The alignment 43 resumes after a duration $T_{13}$ at a time $t_{13}$ if no further movement is detected until a time $t_{14}$ when movements are again detected, i.e. for a duration $T_{14}$. The alignment 43 resumes a second time at a time $t_{15}$ if no further movement is detected, i.e. after a duration $T_{15}$.

FIG. 8 shows the different times used in the preceding algorithm and taken at a time $t_{16}$, i.e. a duration $T_{16}$ after the time $t_{15}$. These different times are shown on the horizontal axes. The duration of actual alignment "Tps_ALN_actual" corresponds to the sum of the durations $T_{12}$, $T_{14}$ and $T_{16}$ and the time elapsed since the start of the alignment 43 (Tps_ALN_total) corresponds to the sum of the durations $T_{12}$ to $T_{16}$. The remaining alignment duration "Tps_ALN_remaining" is obtained by subtracting the duration "Tps_ALN_actual" from the duration "ALN_Duration". This remaining alignment duration is added to the time "Tps_ALN_total" and the sum is compared with the duration "Max_Duration". At the time $t_{16}$, the sum (Tps_ALN_total+Tps_ALN_remaining) is slightly greater than the duration "Max_Duration". The Boolean variable "B_ALN_TooLong" then changes to the value "true". Consequently, the alignment algorithm 43 is abandoned. A message can be displayed on the display 2 of the stand-by instrument to inform the pilot that the inertial unit is not aligned. The pilot can then restart the global alignment 40 or the fine alignment 43. The global alignment 40 or the fine alignment 43 can also be restarted automatically.

It is of course possible to consider other embodiments for limiting the duration of the alignment 43. In particular, the duration "Tps_ALN_actual" and the duration "Tps_ALN_total" can be incremented as from the setup 42.

The invention claimed is:

1. A method for stand-alone alignment of an inertial unit for an onboard instrument capable of being mounted in an aircraft, including the following steps:
    monitoring an appearance of a movement of the inertial unit during alignment;
    suspending the alignment of the inertial unit in the event of the appearance of movement; and
    resuming the alignment of the inertial unit on the disappearance of the movement, wherein
    the step of suspending the alignment of the inertial unit includes a sub-step comprising storing current values used for the alignment, and
    the step of resuming the alignment includes a sub-step comprising recovering the recorded values for continuation of the alignment.

2. The method of claim 1, wherein the onboard instrument is a stand-by instrument generating and displaying information relating to the speed, altitude and attitude of the aircraft.

3. The method of claim 1, wherein the appearance of movement is detected by an accelerometer.

4. The method of claim 1, wherein the monitored movement comprises a rotation around a yaw axis of the aircraft and a translation following at least one of the yaw axis of the aircraft, a roll axis and a pitch axis of the aircraft.

5. The method of claim 1, wherein the alignment of the inertial unit is suspended if the movement exceeds a predefined threshold.

6. The method of claim 1, wherein the duration of the alignment, if no movement is detected, is a fixed, parameterizable duration.

7. The method of claim 1, wherein a start of the alignment triggers a countdown of a remaining duration before an end of the alignment and wherein the suspension of the alignment results in a suspension of the countdown of the remaining duration.

8. The method of claim 7, wherein the alignment of the inertial unit is cancelled if the remaining duration before the end of the alignment added to the time elapsed since the start of the alignment is greater than a determined maximum duration.

9. The method claim 1, wherein the inertial unit comprises three gyrometers which can each measure an angular speed of a frame of reference linked to the onboard instrument in relation to an inertial frame of reference.

10. The method of claim 1, wherein the inertial unit comprises a plurality of gyrometers and wherein the alignment of the inertial unit includes a step of determination of a drift of each gyrometer.

11. The method of claim 10, wherein the step of determination of a drift of each gyrometer includes a step of determination of a maximum value for each drift and a step of precise determination of each drift.

12. An onboard instrument capable of being mounted in an aircraft, the onboard instrument including:
    an inertial unit comprising means for stand-alone alignment;
    means for monitoring an appearance of a movement of the inertial unit during the alignment;
    means for suspending the alignment in an event of the appearance of movement; and
    means for resuming the alignment of the inertial unit on the disappearance of the movement, wherein
    the means for suspending the alignment comprises a memory in which current values used for the alignment are stored, and
    the means for resuming the alignment allows the current stored values to be recovered for a continuation of the alignment.

13. The onboard instrument of claim 12, wherein the onboard instrument is a stand-by instrument for generating and displaying information relating to a speed, altitude and attitude of the aircraft.

14. The method of claim 1, wherein during the alignment, internal drifts of the inertial unit are estimated using measurements of drifts of gyrometers, the drifts are memorized when the alignment is suspended and used during alignment when the alignment is resumed.

15. The onboard instrument of claim 12, wherein during the alignment, internal drifts of the inertial unit are estimated using measurements of drifts of gyrometers, the drifts are memorized when the alignment is suspended and used during alignment when the alignment is resumed.

\* \* \* \* \*

UNITED STATES PATENT AND TRADEMARK OFFICE
CERTIFICATE OF CORRECTION

PATENT NO. : 8,612,145 B2  Page 1 of 1
APPLICATION NO. : 12/809598
DATED : December 17, 2013
INVENTOR(S) : Chevalier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 736 days.

Signed and Sealed this
Twenty-second Day of September, 2015

Michelle K. Lee
*Director of the United States Patent and Trademark Office*